Patented June 25, 1946

2,402,604

UNITED STATES PATENT OFFICE 2,402,604

POLYMERIC HYDROXAMIC ACIDS

Donald D. Coffman, Wilmington, Del., assignor to E. I. du Pont de Nemours & Company, Wilmington, Del., a corporation of Delaware No Drawing. Application November 3, 1942, Serial No. 464,385

3 Claims. (Cl. 260—78)

This invention relates to new polymeric materials and more particularly to products of this kind comprising polymeric hydroxamic acids.

The simple monomeric hydroxamic acids are well known and the preparation of certain complex members of these acids has recently been described. The polymeric hydroxamic acids with which this invention is concerned have not, however, been prepared previously.

This invention has as an object the preparation of new compositions of matter. A further object is the manufacture of polymeric hydroxamic acids and more particularly those polymeric hydroxamic acids which are polymers of alpha, beta-ethylenically unsaturated aliphatic carboxylic acids in which at least a substantial proportion of the acidic hydroxyl groups of the polymeric acid have been replaced by —NHOH groups. Still more particularly an object of this invention is the preparation of polymers of this kind that are soluble in aqueous alkaline systems. Further objects reside in processes by means of which these polymeric materials can be obtained. Other objects will appear hereinafter.

The above objects are accomplished by the methods hereinafter described which comprise reacting a polymeric carboxylic anhydride with hydroxylamine.

The polymeric carboxylic acid anhydrides used in the practice of this invention are known products. They are:

1. Self polymers of polymerizable aliphatic monocarboxylic acid anhydrides having a methylene (CH₂) group attached by an ethylenic double bond to a carbon alpha to the carbonyl carbon of the carboxylic acid anhydride group. Examples of such are the self polymers of carboxylic acid anhydrides of the acrylic series, for example polyacrylic acid anhydride, poly-alpha-methacrylic acid anhydride, poly-alpha-ethacrylic acid anhydride, etc.

2. Interpolymers of acid anhydrides of the acrylic series with polymerizable vinyl or vinylidene compounds, for example interpolymers of methacrylic anhydride with methyl methacrylate or styrene.

3. Interpolymers of alpha-ethylenically unsaturated dicarboxylic acid anhydrides, e. g., maleic anhydride with terminally unsaturated monoolefins, for example ethylene, propylene, diisobutylene, isobutylene, methylenecyclohexane, etc. as disclosed in copending Hanford application, Serial No. 410,337, filed September 10, 1941, now U. S. Patent 2,378,629.

4. Interpolymers of alpha-ethylenically unsaturated dicarboxylic acid anhydrides, for example maleic anhydride with cyclic terpenes, for example dipentene, as prepared by the process of U. S. Patent 2,118,925.

5. Interpolymers of maleic anhydride, terpenes and a polymerizable third component, for example styrene or indene as prepared by the process of copending application Lundquist, Serial No. 413,903, filed October 6, 1941, now U. S. Patent 2,383,399.

6. Interpolymers of alpha-ethylenically unsaturated alpha, beta-dicarboxylic acid anhydrides, for example maleic anhydride, with compounds capable of being polymerized and containing a single

group, or more specifically polymerizable vinyl or vinylidene compounds, for example vinyl esters, e. g. vinyl acetate, vinyl halides, e. g., vinyl chloride, styrene, acrylic acid and its esters, e. g. methyl acrylate, methacrylic acid and its esters, e. g. methyl methacrylate, etc., by the method described in U. S. Patent 2,047,398.

The preferred polymeric anhydrides from which the polymeric hydroxamic acids are formed are interpolymers of which maleic anhydride is one component, and especially those interpolymers of maleic anhydride with polymerizable ethylenically unsaturated compounds which have an ethylenic double bond attached to terminal methylene (CH₂) group. Among this latter group of compounds are the polymerizable vinyl and vinylidene compounds.

In the most satisfactory method for carrying out the invention the polymeric anhydride and hydroxylamine are reacted at temperatures below 100° C., that is, below the decomposition temperature of hydroxylamine, for a period which is generally from one to five hours. The reaction is suitably conducted in a medium which is a solvent for the polymeric anhydride, for example dioxane. The polymeric hydroxamic acid usually separates in the form of a solid which may be isolated by simple filtration. If the product is soluble in the reaction medium, precipitation by addition of a non-solvent is a suitable method of isolation. The amounts of reactants used can be varied according to the desired modification in the properties of the product.

The most valuable products, because of solubility in aqueous alkaline systems, are the polymeric hydroxamic acids containing as a portion of the molecule other acidic groups, particularly carboxyl groups. Such products are readily obtained by reacting hydroxylamine with interpolymers of maleic anhydride, since reaction of the anhydride group with hydroxylamine results in the formation of both carboxyl and hydroxamic acid groups.

By polymeric hydroxamic acid is meant a macro-molecular addition polymer in which an appreciable number of the multiply recurring structural units contain hydroxamic acid (—NHOH) groups.

The following examples further illustrate the practice of the invention.

*Example I*

Eleven parts of hydroxylamine dissolved in methanol is added to a methanol solution of styrene/maleic anhydride interpolymer prepared by warming 50 parts of the interpolymer in 159 parts of methanol at 60° C. The mixture is stirred and heated at 65° C. for 4 hours. A solid precipitate is obtained which is filtered, pulverized, washed with cold methanol and then allowed to dry in air. By this means there is obtained 43.5 parts of the polymeric hydroxamic acid. The acid contains 4.35% nitrogen by analysis, indicating that the formation of the hydroxamic acid was 67% complete.

*Example II*

A reaction mixture comprising a methanol solution of 42 parts of ethylene/maleic anhydride interpolymer and a methanol solution of 11 parts of hydroxylamine is heated with stirring at 65° C. The solid which precipitates does not dissolve on further heating and is pulverized under ethyl acetate to obtain 30.5 parts of the polymeric hydroxamic acid. The solid does not melt upon heating up to 340° C., but begins to decompose at 256° C. The ultimate composition ascertained by analysis showing the presence of 4.67% nitrogen indicates that the conversion to hydroxamic acid was 47% complete.

*Example III*

A dioxane solution of styrene/maleic anhydride interpolymer is prepared by warming 50 parts of the interpolymer in 200 parts of dioxane at 60° C. To this solution 11 parts of hydroxylamine dissolved in 50 parts of dioxane is added and the mixture is heated with stirring at 65° C. for 4 hours. The solid which precipitates is filtered, pulverized, washed with cold dioxane and then allowed to dry in air. By this means there is obtained 45 parts of a polymeric hydroxamic acid comparable to the product obtained in Example I.

In addition to the preferred type of polymeric carboxylic acid anhydrides used in the examples other polymeric carboxylic acid anhydrides can be used. Examples of these are polymethacrylic anhydride, polyacrylic anhydride, poly-alpha-chloracrylic anhydride, indene/maleic anhydride interpolymer, styrene/dipentene/maleic anhydride interpolymer and vinyl acetate/maleic anhydride interpolymer.

While the reaction of hydroxylamine with the polymeric carboxylic acid anhydride to obtain the polymeric hydroxamic acid is preferably conducted at temperatures of 40°–70° C. for 2–4 hours, other reaction conditions can be employed. For practical purposes, the upper temperature limit of the reaction is the boiling point of the reaction mixture under atmospheric pressure, for example about 70° C. in the case of methanol as a solvent. Under superatmospheric pressure, however, any temperature below the decomposition temperature of hydroxylamine, about 90°–100° C. can be employed. Reaction temperatures below the preferred range are also feasible, providing a longer time is allowed for the process.

The proportions of the reactants may be varied widely. Thus, the molecular proportion of the hydroxylamine relative to the acid anhydride group can be in the ratio of 1:20 or higher.

The process is not limited to any particular solvent. While the solvent need not be anhydrous and may contain considerable amounts of water, an organic medium such as methanol or dioxane is preferred. Other suitable organic solvents include ethanol, propanol, isopropanol, butanol, ethyl ether and mixtures thereof. The amount of solvent used may also be varied. Preferably, although it is not essential, there is present sufficient solvent to dissolve the reactants completely. For convenience an excess of solvent is avoided, but large quantities can also be used successfully.

An alternative procedure for preparing the polymeric hydroxamic acids consists in reacting a polymeric carboxylic acid halide with hydroxylamine at a temperature not higher than 100° C. in a medium inert to the acid halide and preferably containing an acid acceptor, for example pyridine. Examples of such inert media include ethyl ether, benzene, hexane, chloroform, carbon tetrachloride, dioxan and the dimethyl ether of diethylene glycol. The reaction of the polymeric acid halide with hydroxylamine is usually vigorous and is preferably carried out at temperatures between 0° and 30° C. At these temperatures the reaction proceeds to completion within a few minutes. While the proportions of the reactants may be varied, it is usually preferable to employ less than an equivalent amount of hydroxylamine per acid halide group. The molecular proportion of hydroxylamine relative to the acid halide group is usually 1:2 but can be considerably lower.

Suitable polymeric carboxylic acid halides include polymethacrylyl chloride, polyacrylyl chloride, styrene/fumaric acid dichloride, dipentene/fumaric acid dichloride, indene/fumaric acid dichloride and poly-alpha-ethyl-acrylyl chloride.

In the preferred products all the acid halide groups are not reacted with hydroxylamine and the acid halide groups remaining in the polymer after reaction with hydroxylamine are hydrolyzed to carboxylic acid groups.

Another alternative procedure for preparing the polymeric hydroxamic acids consists in reacting with hydroxylamine an ester of a polymeric carboxylic acid in a liquid medium containing an amount of a basic substance usually in the form of an alkali metal hydroxide or alcoholate or a quaternary or tertiary amine base molecularly equivalent to the hydroxylamine. In this procedure the polymeric hydroxamic acid is obtained in the form of a salt and is subsequently liberated from the salt by double decomposition with another acid.

Examples of polymeric carboxylic esters which may be used to form the polyhydroxamic acids are methyl salicylate/formaldehyde polymer, styrene/diethyl fumarate polymer, vinyl chloride/dimethyl fumarate interpolymer, vinyl chloride/diethyl maleate interpolymer, and polymethyl methacrylate.

The alcohol with which the polymeric carboxylic acid is esterified is not limited but can be any alcohol such as methanol, propanol, isopropanol, butanol, isobutanol, or any of the isomeric amyl, hexyl or octyl alcohols. Mixed esters, that is, compounds containing two or more different alcohol residues can also be employed.

The basic substance employed in the reaction forming a polymeric hydroxamic acid salt can be sodium ethylate, potassium ethylate, sodium methylate, potassium methylate, sodium hydroxide, barium hydroxide, or organic bases containing no hydrogen attached to nitrogen, such as trimethylamine or trimethylbenzylammonium hydroxide.

It is preferred to operate in a temperature range the upper limit of which is the boiling point of the reaction mixture at atmospheric pressure. For example, if methanol is used about 70° C. is the upper limit. Any temperature below the decomposition temperature of hydroxylamine, about 90°–100° C. may be employed. Temperatures of 30° C. or below are feasible providing a longer time is allowed for the process. Likewise the proportions of the reactants may be varied widely.

The polymeric carboxylic acid ester must, of course, be soluble in a suitable solvent in order for the reaction to take place. Suitable solvents are ethanol, propanol, methanol, isopropanol, butanol, dioxane, ethyl ether and mixtures thereof.

In freeing the hydroxamic acid from its salt it is necessary only that the acid with which the water-soluble hydroxamic acid salt is treated be a more strongly acidic substance than the hydroxamic acid itself or that the reagent used in freeing the hydroxamic acid from its metal salt form an insoluble compound with the metallic ions present after removing them from solution. In the preparation of the acid from the salt such acids as acetic, propionic, adipic, phosphoric or sulfuric acids can be used. Acids which exert a strong reducing or oxidizing action are to be avoided since they may destroy the hydroxamic acid.

In the preferred products formed by this method only a portion of the ester groups are reacted with hydroxylamine to form the hydroxamic acid. The unreacted ester groups are then subjected to hydrolysis to form carboxyl groups in the polymeric molecule.

Polymeric hydroxamic acids can also be prepared by reacting hydroxylamine with polymeric amides, for example polymethacrylamide, polyacrylamide, etc.

In preparing the polymeric hydroxamic acids sufficient hydroxylamine is used to introduce a substantial number of —NHOH groups into the polymeric molecule. By substantial number is meant that at least 5% and preferably more than 20% of the groups reactive with hydroxyl amine have been converted to hydroxamic acid groups.

The hydroxylamine used in this process may be prepared from the hydroxylamine salts such as hydroxylamine hydrochloride or hydroxylamine sulfate by treating an aqueous solution of these salts with sodium or potassium hydroxide or with sodium or potassium carbonate or with calcium hydroxide. The hydroxylamine methanol solution used in the examples may be prepared by adding a molecularly equivalent proportion of sodium methylate dissolved in methanol cooled to 20° C. to a solution of hydroxylamine hydrochloride in methanol. The precipitated sodium chloride can be separated by filtration. It is unnecessary to free the hydroxylamine solution from inorganic salts before introducing therein the polymeric carboxylic acid anhydride, acid chloride or ester to form the polyhydroxamic acid.

The new polymers described herein are useful in the treatment of hides and leathers, and particularly in the bleaching of chrome-tanned skins for the production of white leather. The products are applied to the freshly tanned and shaved chrome stock at pH values from 2.5 to 3.0 in accordance with the existing practice for the use of syntans.

The products of this invention preferred for use in hide and leather treatment contain not only hydroxamic acid groups but also carboxyl groups. The beneficial action of the carboxyl group in tanning agents is well known and in the case of the polymeric hydroxamic acids containing carboxyl groups these hydroxamic groups contribute materially to the affinity of the polymeric hydroxamic acids for leather or hides.

The present products are also advantageously incorporated in viscose by addition of the polymeric hydroxamic acid to the spinning solution.

As many apparently widely different embodiments of this invention may be made without departing from the spirit and scope thereof, it is to be understood that I do not limit myself to the specific embodiments thereof except as defined in the appended claims.

I claim:

1. A polymeric hydroxamic acid containing free carboxyl groups and comprising the reaction product of hydroxylamine with a maleic anhydride interpolymer comprising the interpolymerization product of maleic anhydride with a polymerizable ethylenically unsaturated compound having an ethylenic double bond attached to a terminal methylene group.

2. A polymeric hydroxamic acid containing free carboxyl groups and comprising the reaction product of hydroxylamine with the interpolymer of styrene and maleic anhydride.

3. A polymeric hydroxamic acid containing free carboxyl groups and comprising the reaction product of hydroxylamine with the interpolymer of ethylene and maleic anhydride.

DONALD D. COFFMAN.